US007484080B2

(12) United States Patent
Chaudhry et al.

(10) Patent No.: US 7,484,080 B2
(45) Date of Patent: Jan. 27, 2009

(54) ENTERING SCOUT-MODE WHEN STORES ENCOUNTERED DURING EXECUTE-AHEAD MODE EXCEED THE CAPACITY OF THE STORE BUFFER

(75) Inventors: Shailender Chaudhry, San Francisco, CA (US); Marc Tremblay, Menlo Park, CA (US); Paul Caprioli, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 256 days.

(21) Appl. No.: 11/103,912

(22) Filed: Apr. 11, 2005

(65) Prior Publication Data

US 2005/0251668 A1    Nov. 10, 2005

Related U.S. Application Data

(60) Provisional application No. 60/562,856, filed on Apr. 15, 2004.

(51) Int. Cl.
*G06F 9/00* (2006.01)

(52) U.S. Cl. .................................. 712/225; 711/213

(58) Field of Classification Search ................ 712/220, 712/225, 228, 235; 711/213
See application file for complete search history.

(56) References Cited

U.S. PATENT DOCUMENTS

| 5,904,732 | A | * | 5/1999 | Greenley et al. ............... 710/57 |
| 6,011,908 | A | * | 1/2000 | Wing et al. .................... 714/19 |
| 6,385,715 | B1 | * | 5/2002 | Merchant et al. ............. 712/219 |
| 6,470,445 | B1 | * | 10/2002 | Arnold et al. ................ 712/218 |
| 6,665,776 | B2 | * | 12/2003 | Jouppi et al. ................ 711/137 |
| 6,665,792 | B1 | * | 12/2003 | Merchant et al. ............. 712/219 |
| 7,149,851 | B1 | * | 12/2006 | Rozas et al. ................ 711/141 |
| 2005/0071603 | A1 | * | 3/2005 | Jamil et al. ................. 712/214 |

OTHER PUBLICATIONS

James Dundas and Trevor Mudge, "Improving Data Cache Performance by Pre-Executing Instructions Under a Cache Miss," 11th ACM International Conference on Supercomputing, Jul. 1997.*
R. Radhakrishnan, L.K. John, A Performance Study of Modern Web Applications, Euro-Par 1999.*

(Continued)

*Primary Examiner*—Richard Ellis
*Assistant Examiner*—Keith Vicary
(74) *Attorney, Agent, or Firm*—Park, Vaughan & Fleming LLP (57) ABSTRACT

One embodiment of the present invention provides a system that facilitates deferring execution of instructions with unresolved data dependencies as they are issued for execution in program order. During a normal execution mode, the system issues instructions for execution in program order. Upon encountering an unresolved data dependency during execution of an instruction, the system generates a checkpoint that can subsequently be used to return execution of the program to the point of the instruction. Next, the system executes the instruction and subsequent instructions in an execute-ahead mode, wherein instructions that cannot be executed because of an unresolved data dependency are deferred, and wherein other non-deferred instructions are executed in program order. Upon encountering a store during the execute-ahead mode, the system determines if the store buffer is full. If so, the system prefetches a cache line for the store, and defers execution of the store. If the number of stores that are encountered during execute-ahead mode exceeds the capacity of the store buffer, which means that the store buffer will never have additional space to accept additional stores during the execute-ahead mode because the store buffer is gated, the system directly enters the scout mode, without waiting for the deferred queue to eventually fill.

19 Claims, 6 Drawing Sheets

OTHER PUBLICATIONS

Publication entitled "Runahead Execution: An Alternative to Very Large Instruction Windows for Out-of-order Processors", by Onur Mutlu et al., Proceedings of the Ninth International Symposium on High-Performance Computer Architecture, 2002, IEEE.

Publication entitled "Beating in-order stalls with "flea-flicker" two-pass pipelining", by Ronald D. Barnes et al., Proceedings of the 36th International Symposium on Microarchitecture, 2003, IEEE.

* cited by examiner

ENTERING SCOUT-MODE WHEN STORES ENCOUNTERED DURING EXECUTE-AHEAD MODE EXCEED THE CAPACITY OF THE STORE BUFFER

RELATED APPLICATION

This application hereby claims priority under 35 U.S.C. §119 to U.S. Provisional Patent Application No. 60/562,856 filed on 15 Apr. 2004, entitled "Entering Scout Mode When Stores Encountered During Execute-Ahead Mode Exceed the Capacity of the Store Buffer," by inventors Shailender Chaudhry, Marc Tremblay and Paul Caprioli.

BACKGROUND

1. Field of the Invention

The present invention relates to techniques for improving the performance of computer systems. More specifically, the present invention relates to a method and an apparatus for entering scout-mode when stores encountered during execute-ahead mode exceed the capacity of the store buffer.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some processor designers have proposed entering a "scout mode" during processor stall conditions. In this scout mode, instructions are speculatively executed to prefetch future loads, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. This solution to the latency problem eliminates the complexity of the issue queue and the rename unit, and also achieves memory-level parallelism. However, it suffers from the disadvantage of having to re-compute any computational operations that are performed while in scout mode.

Hence, what is needed is a method and an apparatus for hiding memory latency without the above-described drawbacks of existing processor designs.

SUMMARY

One embodiment of the present invention provides a system that facilitates deferring execution of instructions with unresolved data dependencies as they are issued for execution in program order. During a normal execution mode, the system issues instructions for execution in program order. Upon encountering an unresolved data dependency during execution of an instruction, the system generates a checkpoint that can subsequently be used to return execution of the program to the point of the instruction. Next, the system executes the instruction and subsequent instructions in an execute-ahead mode, wherein instructions that cannot be executed because of an unresolved data dependency are deferred, and wherein other non-deferred instructions are executed in program order. Upon encountering a store during the execute-ahead mode, the system determines if the store buffer is full. If so, the system prefetches a cache line for the store, and defers execution of the store.

In a variation on this embodiment, deferring the store involves inserting the store into a deferred queue, which contains deferred instructions in program order.

In a variation on this embodiment, after a store is deferred into the deferred queue during execute-ahead mode, if a load is subsequently encountered, the system prefetches a cache line for the load, and defers execution of the load to prevent a possible read-after-write (RAW) hazard.

In a variation on this embodiment, while executing the instruction and subsequent instructions in an execute-ahead mode, the store buffer is gated so that stores that enter the store buffer during execute-ahead mode remain in the store buffer until the processor leaves the execute-ahead mode.

In a variation on this embodiment, upon encountering a load during the execute-ahead mode, the system determines if a load buffer is full. If so, the system: prefetches a cache line for the load; defers execution of the load; and marks a destination register for the load to indicate that the value in the destination register is subject to an unresolved data dependency.

In a variation on this embodiment, if a non-data-dependent stall condition is encountered in normal execution mode, the system generates a checkpoint that can subsequently be used to return execution of the program to the point of the non-data-dependent stall condition. Next, the system enters a scout mode, wherein instructions are speculatively executed to prefetch future loads, but wherein results are not committed to the architectural state of the processor. When the non-data-dependent stall condition that caused the processor to move out of normal execution mode is finally resolved, the system uses the checkpoint to resume execution in normal execution mode from the instruction that originally encountered the stall condition.

In a variation on this embodiment, if a non-data-dependent stall condition that is not a load buffer full condition or a store buffer full condition is encountered in execute-ahead mode, the system enters a scout mode, wherein instructions are speculatively executed to prefetch future loads, but wherein results are not committed to the architectural state of the processor. When the unresolved data dependency or the nondata-dependent stall condition that originally caused the processor to move out of normal execution mode is finally resolved, the system uses the checkpoint to resume execution in normal execution mode from the instruction that originally encountered the stall condition.

In a variation on this embodiment, if the unresolved data dependency is resolved during execute-ahead mode, the system executes deferred instructions in a deferred mode. If all deferred instructions are executed during the deferred mode, the system returns to the normal execution mode to resume normal program execution from the point where the execute-ahead mode left off.

In a variation on this embodiment, executing deferred instructions in the deferred mode involves: issuing deferred instructions for execution in program order; deferring execution of deferred instructions that still cannot be executed because of unresolved data dependencies; and executing other deferred instructions that able to be executed in program order. If some deferred instructions are deferred again, the system returns to execute-ahead mode at the point where execute-ahead mode left off.

In a variation on this embodiment, executing instructions involves keeping track of data dependencies to facilitate determining if a given instruction is subject to an unresolved data dependency. This can involve maintaining state information for each register, which indicates whether or not a value in the register depends on an unresolved data dependency.

In a variation on this embodiment, the unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

In a variation on this embodiment, if the number of stores that are encountered during execute-ahead mode exceeds the capacity of the store buffer, which means that the store buffer will never have additional space to accept additional stores during the execute-ahead mode because the store buffer is gated, the system directly enters the scout mode, without waiting for the deferred queue to eventually fill.

In a variation on this embodiment, while executing deferred instructions in the deferred mode, if a deferred store is encountered, and the store buffer now has capacity because one or more stores that entered to store buffer prior to execute-ahead mode have left the store buffer, the system enters the deferred store into the store buffer instead of deferring the deferred store again. If no stores remain in the deferred queue, subsequent loads and stores are no longer forcefully deferred.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Processor

Figure 1:
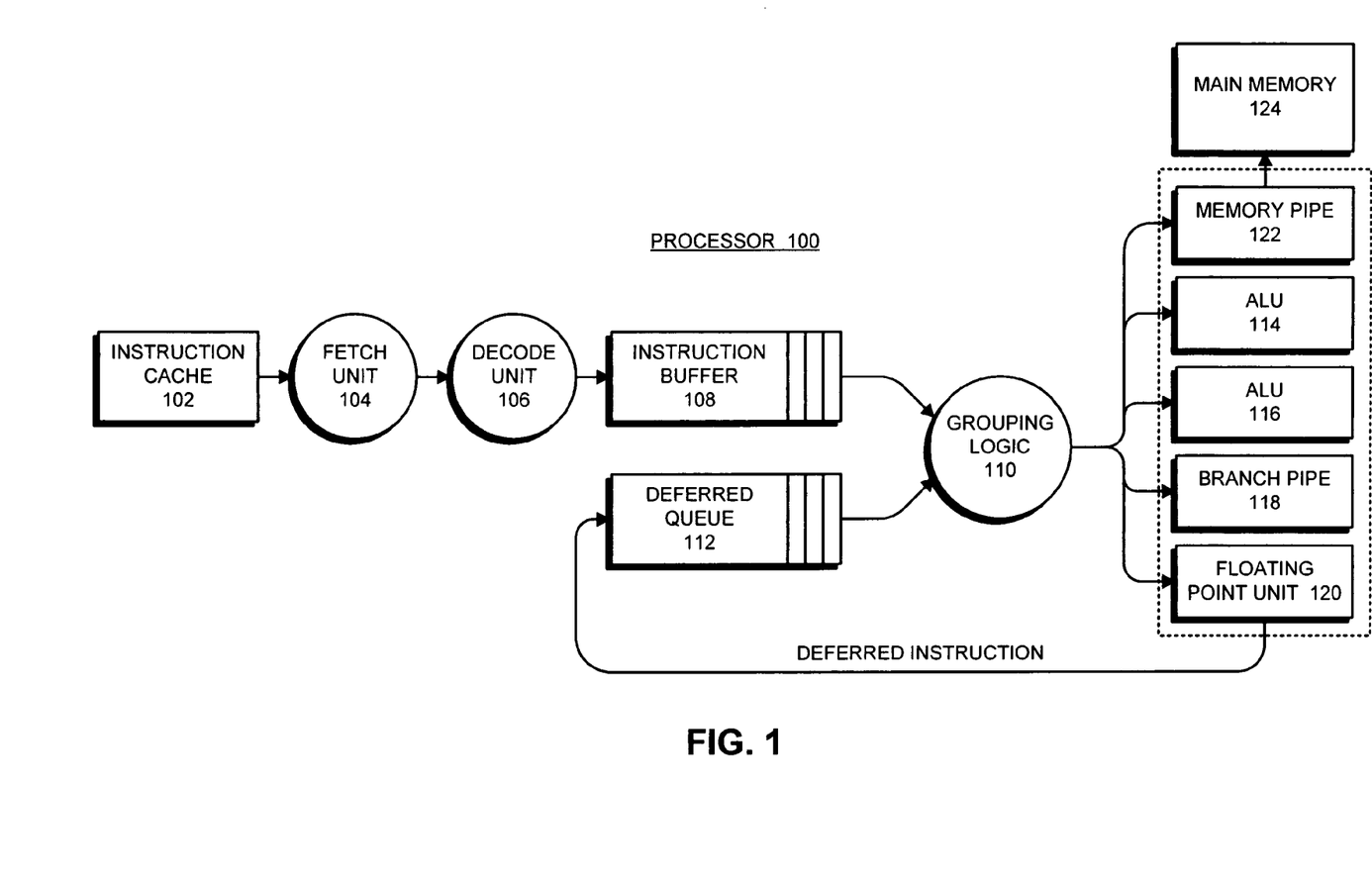
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, main memory 124, arithmetic logic unit (ALU) 114, ALU 116, branch pipe 118 and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions. This process is described in more detail below with reference to FIG. 5.

Buffers

Figure 2:
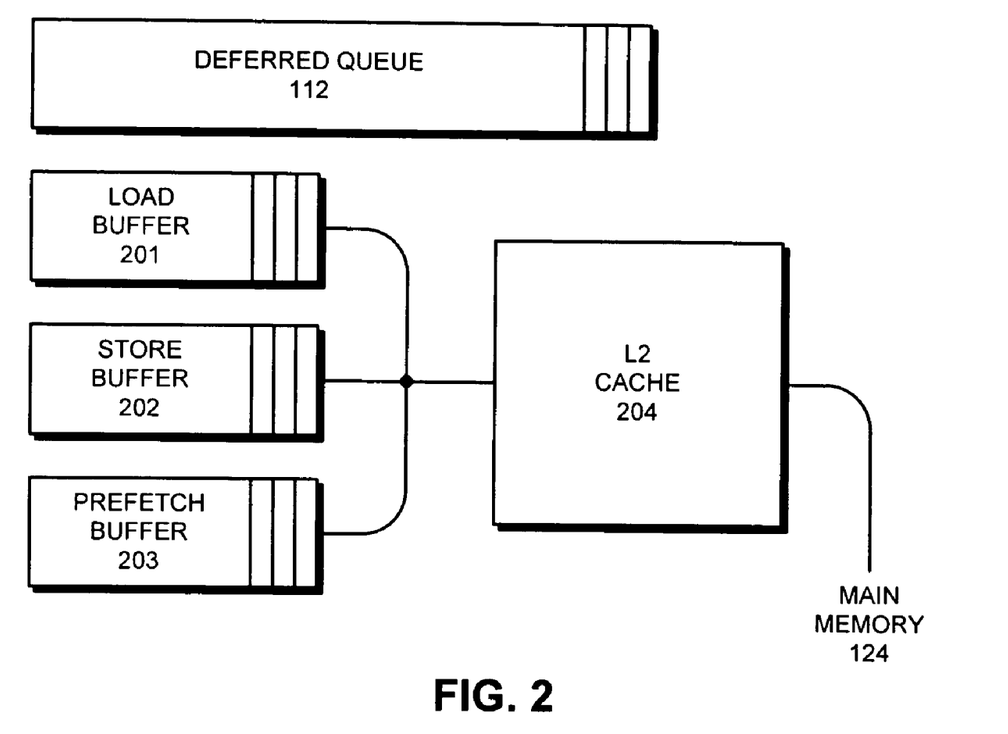
FIG. 2 illustrates various buffers within a processor in accordance with an embodiment of the present invention.

FIG. 2 illustrates various buffers within processor 100 in accordance with an embodiment of the present invention. These buffers include load buffer 201, store buffer 202 and prefetch buffer 203, which are well-known structures in existing processors. Also illustrated in FIG. 2 is a deferred queue 112 (from FIG. 1) and Level 2 (L2) cache 204.

Load buffer 201, store buffer 202 and prefetch buffer 203 hold entries for load, store and prefetch instructions that are waiting to access slower portions of the memory hierarchy, such as L2 cache 204 and possibly main memory 124.

The present invention exploits the instruction storage capacity of the deferred queue 112 to increase the effective size of load buffer 201 and store buffer 202. This is accomplished as follows. If load buffer 201 or store buffer 202 becomes full, additional loads or stores get deferred into deferred queue 112 as is described below with reference to FIGS. 3-9. All of this is accomplished without violating data flow dependencies.

Note that processor 100 needs to track when the load or store buffers are full. This can be done in several ways. For example, a credit mechanism can be employed in which credits are decremented upon issuing a load or store and the respective credit is returned when the load or store completes. Alternately, the load/store unit of processor 100 can signal the issue unit of processor 100 when it receives a load or store that would overflow one of its buffers. Regardless, the issue unit knows that the load or store could not be issued and so defers its execution by placing it into deferred queue 112.

Keeping Track of Dependencies

Figure 3:
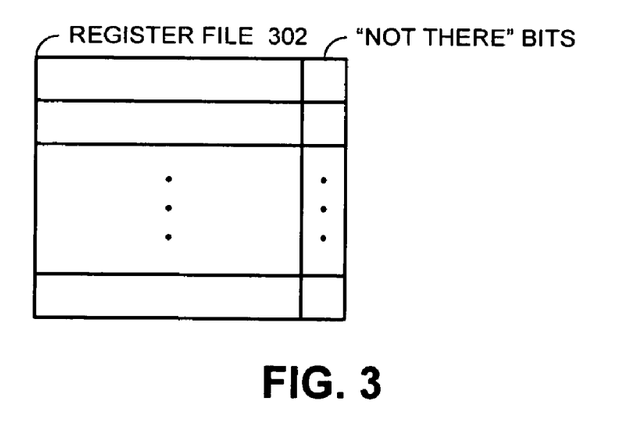
FIG. 3 illustrates a register file in accordance with an embodiment of the present invention.

The present invention keeps track of data dependencies in order to determine if an instruction is subject to an unresolved data dependency. In one embodiment of the present invention, this involves maintaining state information for each register, which indicates whether or not a value in the register depends on an unresolved data dependency. For example, FIG. 3 illustrates a register file 302 in accordance with an embodiment of the present invention. Each register in register file 302 is associated with a "not-there" bit, which keeps track of whether a valid operand value is contained in the register, or if the operand cannot be produced because of an unresolved data dependency. For example, if a register is waiting for an operand to return from a load operation, the corresponding not-there bit is set to indicate that the desired operand value is not present in the register.

When a subsequent instruction references a source operand value that is marked as not-there, and generates a result that is stored in a destination register, the system marks the destination register as not-there to indicate that the value in the destination register also depends on the unresolved data-dependency. This can be accomplished by marking the not-there bit of the destination register with the "OR" of the not-there bits for source registers of the instruction.

Structures for Keeping Track of Stores

Figure 4A:
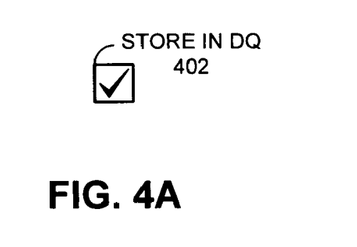
FIG. 4A illustrates a "store-in-DQ" indicator in accordance with an embodiment of the present invention.

FIG. 4A illustrates a store-in-DQ indicator 402 in accordance with an embodiment of the present invention. Store-in-DQ indicator 402 is set whenever a store is deferred into deferred queue 112, and is cleared when all deferred stores are removed from deferred queue 112.

Figure 4B:
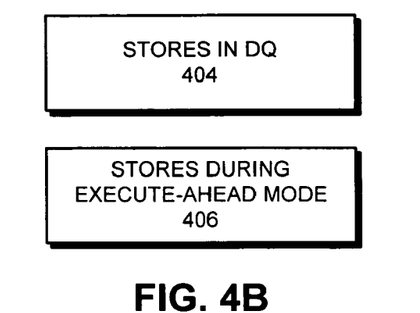
FIG. 4B illustrates various counters for keeping track of stores during execute-ahead mode in accordance with an embodiment of the present invention.

In another embodiment of the present invention, instead of maintaining a single store-in-DQ indicator 402, the system maintains a stores-in-DQ counter 404 and a stores-during-execute-ahead-mode counter 406 as is illustrated in FIG. 4B. Stores-in-DQ counter 404 keeps track of the number of stores in deferred queue 112, and hence, is a generalization of the store-in-DQ indicator 402. In contrast, stores-during-execute-ahead-mode counter 406 enables the system to determine if the number of stores that are deferred during execute-ahead mode exceed the capacity of the store buffer, and if so to immediately enter scout mode as is described in more detail below with reference to FIG. 8.

State Diagram

Figure 5:
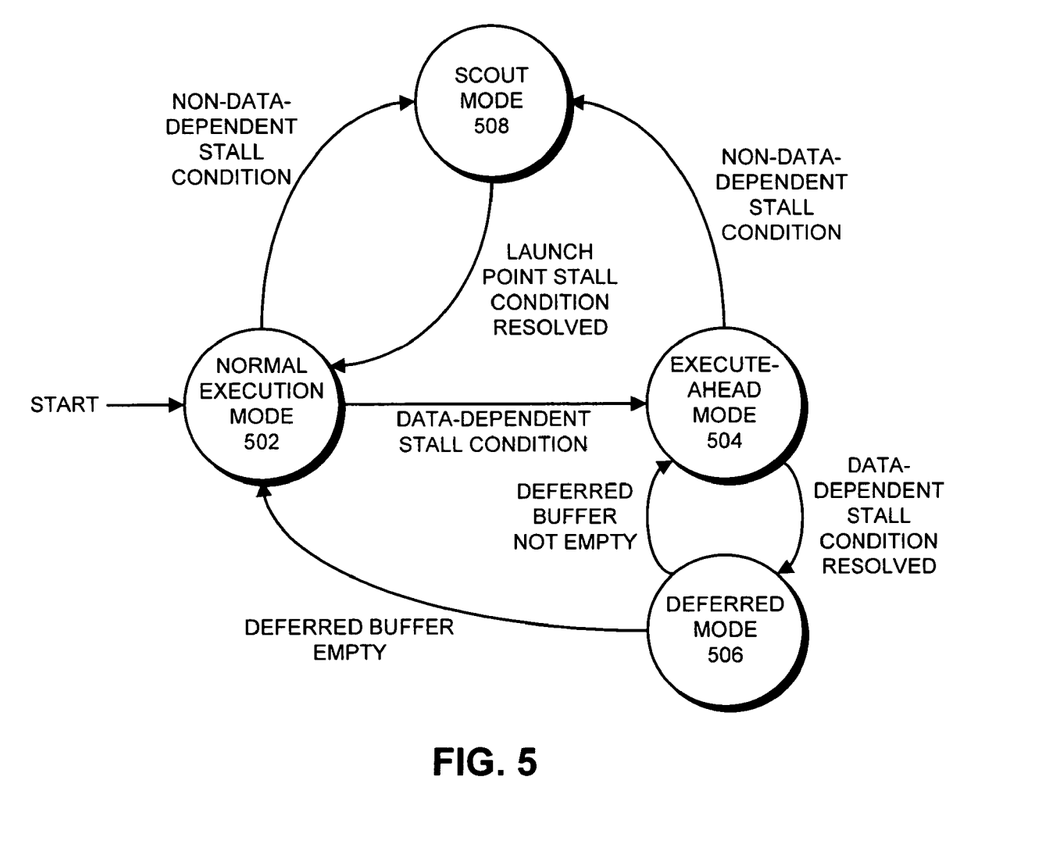
FIG. 5 presents a state diagram, which includes execute-ahead mode and scout mode, in accordance with an embodiment of the present invention.

FIG. 5 presents a state diagram which includes execute-ahead mode 504 and the scout mode 508 in accordance with an embodiment of the present invention. The system starts in normal execution mode 502, wherein instructions are executed in program order as they are issued from instruction buffer 108 (see FIG. 1).

Next, if an unresolved data dependency arises during execution of an instruction, the system moves to execute-ahead mode 504. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 504, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 504 or deferred mode 506.) The system also "defers" execution of the instruction that encountered the unresolved data dependency by storing the instruction in deferred queue 112.

While operating in execute-ahead mode 504, the system continues to execute instructions in program order as they are received from instruction buffer 108, and any instructions that cannot execute because of an unresolved data dependency are deferred into deferred queue 112.

During execute-ahead mode 504, if an unresolved data dependency is finally resolved, the system moves into deferred mode 506, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instruction back into deferred queue 112. On the other hand, the system executes other instructions that can be executed in program order with respect to each other.

After the system completes a pass through deferred queue 112, if deferred queue 112 is empty, the system moves back into normal execution mode 502. This may involve committing changes made during execute-ahead mode 504 and deferred mode 506 to the architectural state of processor 100, if such changes have not been already committed. It can also involve throwing away the checkpoint generated when the system moved into execute-ahead mode 504.

On the other hand, if deferred queue 112 is not empty after the system completes a pass through deferred queue 112, the system returns to execute-ahead mode 504 to execute instructions from instruction buffer 108 from the point where the execute-ahead mode 504 left off.

If a non-data dependent stall condition (except for a load buffer full or store buffer full condition) arises while the system is in normal execution mode 502 or in execute-ahead mode 504, the system moves into scout mode 508. (This non-data-dependent stall condition can include: a memory barrier operation; or a deferred queue full condition.) In scout mode 508, instructions are speculatively executed to prefetch future loads, but results are not committed to the architectural state of processor 100.

Scout mode 508 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 508.

Unfortunately, computational operations performed during scout mode 508 need to be recomputed again, which can require a large amount of computational work.

When the original "launch point" stall condition is finally resolved, the system moves back into normal execution mode 502, and, in doing so, uses the previously generated checkpoint to resume execution from the launch point instruction that encountered the launch point stall condition. The launch point stall condition is the stall condition that originally caused the system to move out of normal execution mode 502. For example, the launch point stall condition can be the data-dependent stall condition that caused the system to move from normal execution mode 502 to execute-ahead mode 504, before moving to scout mode 508. Alternatively, the launch point stall condition can be the non-data-dependent stall condition that caused the system to move directly from normal execution mode 502 to scout mode 508.

Handling a Store in Execute-Ahead Mode

Figure 6:
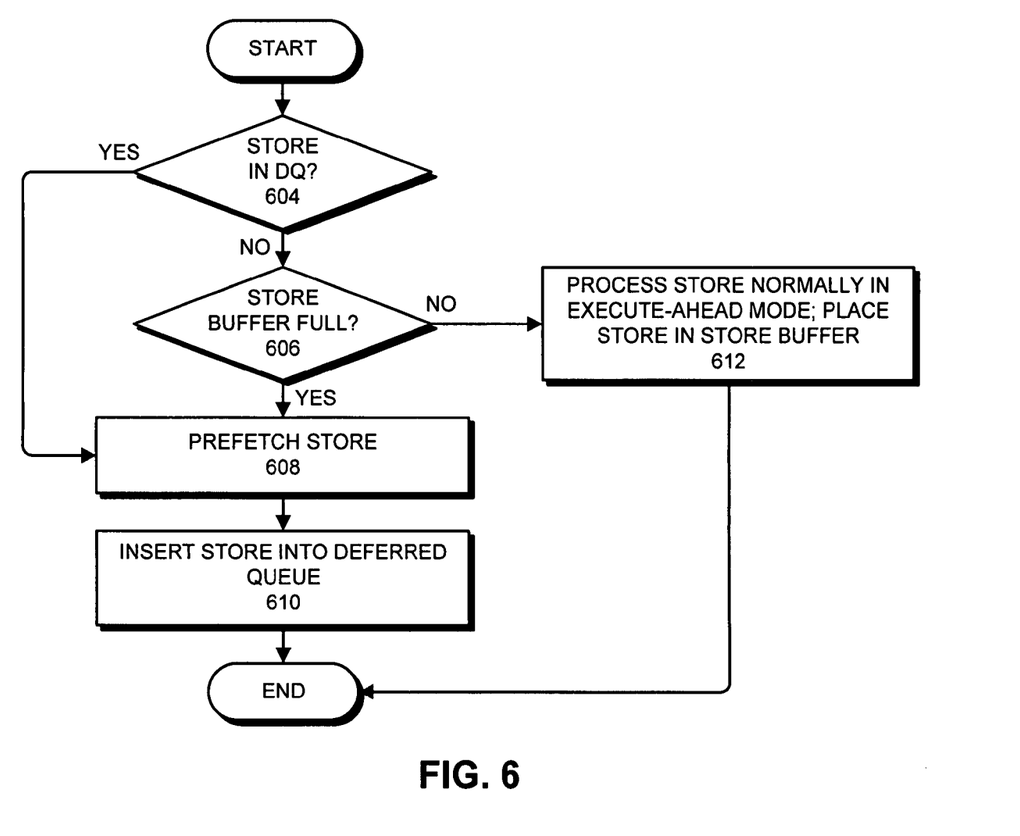
FIG. 6 presents a flow chart illustrating how a store is handled during execute-ahead mode in accordance with an embodiment of the present invention.

FIG. 6 presents a flow chart illustrating how a store is handled during execute-ahead mode 504 in accordance with an embodiment of the present invention. When a store is encountered during execute-ahead mode 504, the system checks store-in-DQ indicator 402 to determine whether there exists a deferred store in the deferred queue 112 (step 604). If so, a subsequent load cannot perform a CAM lookup on deferred queue 112, because unlike store buffer 202, deferred queue 112 lacks the circuitry to perform a CAM lookup. Hence, in order to avoid a potential read-after-write (RAW) hazard, the system defers subsequent loads.

Moreover, because of this deferral of younger loads, it is desirable for the first deferred store to enter store buffer 202 before a younger store. It is also preferable to keep the space in store buffer 202 free, so that upon entering deferred mode 506 the first such deferred store will enter store buffer 202. Hence, instead of executing a subsequent store that follows the first deferred store, the system defers the subsequent store by prefetching the subsequent store (step 608) and inserting the subsequent store into deferred queue 112 (step 610).

Note that store-in-DQ indicator 402 cannot be immediately cleared if a store should complete and free up an entry in the store buffer. Once a store is deferred because of lack of space in store buffer 202, all younger loads in program order must be deferred. Thus, store-in-DQ indicator 402 remains set until processor 100 enters deferred mode 506. At this point the store-in-DQ indicator 402 is cleared. If store buffer 202 is still full, the store that was originally deferred will be deferred again, and system will again set store-in-DQ indicator 402.

On the other hand, if there no longer exists a deferred store in deferred queue 112 at step 604, the system determines if store buffer 202 is full (step 606). If so, the system defers the store by prefetching the store (step 608) and inserting the store into deferred queue 112 (step 610). The system also sets store-in-DQ indicator 402 (if it is not already set), or alternatively increments stores-in-DQ counter 404. Otherwise, if store buffer 202 is not full, the system processes the store normally in execute-ahead mode 504, which involves placing the store into store buffer 202 (step 612).

Handling a Load in Execute-Ahead Mode

Figure 7:
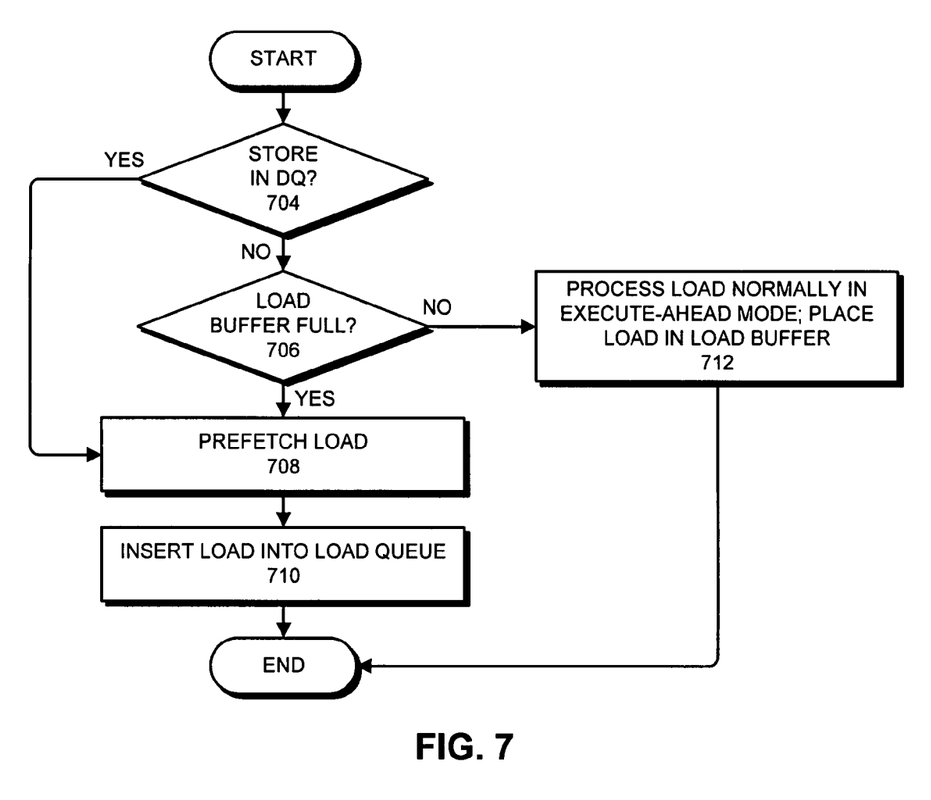
FIG. 7 presents a flow chart illustrating how a load is handled during execute-ahead mode in accordance with an embodiment of the present invention.

FIG. 7 presents a flow chart illustrating how a load is handled during execute-ahead mode 504 in accordance with an embodiment of the present invention. When a load is encountered during execute-ahead mode 504, the system checks store-in-DQ indicator 402 to determine whether there exists a deferred store in the deferred queue 112 (step 704). If so, in order to avoid a potential RAW hazard, the system defers the load by prefetching the load (step 708) and inserting the load into deferred queue 112 (step 710).

On the other hand, if there does not exist a deferred store in deferred queue 112 at step 704, the system determines if load buffer 201 is full (step 706). If so, the system defers the load by prefetching the load (step 708) and inserting the load into deferred queue 112 (step 710). Otherwise, if the load buffer is not full, the system processes the load normally in execute-ahead mode 504, which involves placing the load into load buffer 201 (step 712).

Note that when a load is deferred, its destination register is marked as "not-there." Furthermore, note that the previously-described mechanism for propagating not-there bits works naturally to avoid RAW hazards.

Entering Scout Mode Directly

Figure 8:
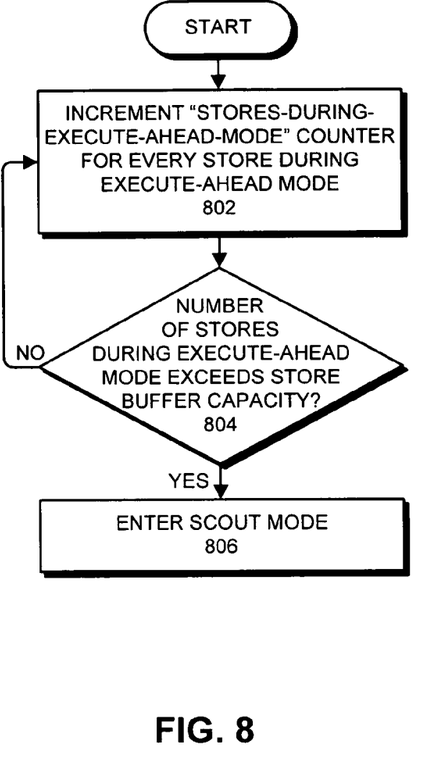
FIG. 8 presents a flow chart illustrating how the system directly enters scout mode when the number of stores encountered during execute-ahead mode exceeds the store buffer capacity in accordance with an embodiment of the present invention.

FIG. 8 presents a flow chart illustrating how the system directly enters scout mode 508 when the number of stores encountered during execute-ahead mode 504 exceeds the capacity of store buffer 202 in accordance with an embodiment of the present invention. During execute-ahead mode 504, the system increments stores-during-execute-ahead-mode counter 406 for every store the system encounters (step 802). The system then determines if stores-during-execute-ahead-mode counter 406 exceeds the capacity of store buffer 202 (step 804).

If so, store buffer 202 will eventually fill with stores encountered during execute-ahead mode 504. Note that these stores will never leave store buffer 202 because store buffer 202 is gated during execute-ahead mode 504. Furthermore, at least one additional store will remain in deferred queue 112. This additional store will never leave deferred queue 112 because there will never be space for it is store buffer 202. Hence, execute-ahead mode 504 will never complete successfully, and deferred queue 112 will eventually fill up with instructions, which will cause the system to enter scout mode 508. Instead of waiting for deferred queue 112 to fill up, one embodiment of the present invention immediately enters scout mode 508 because the system will eventually have to enter scout mode 508 anyway (step 806). Note that the system does not have to always enter scout mode 508 at this point, but can instead decide heuristically whether to stall issue or to immediately enter scout mode 508.

Otherwise, if stores-during-execute-ahead-mode counter 406 does not exceed the capacity of store buffer 202, the system returns to step 802 to resume normal operation in execute-ahead mode 504.

Keeping Track of Stores in the Deferred Queue

Figure 9:
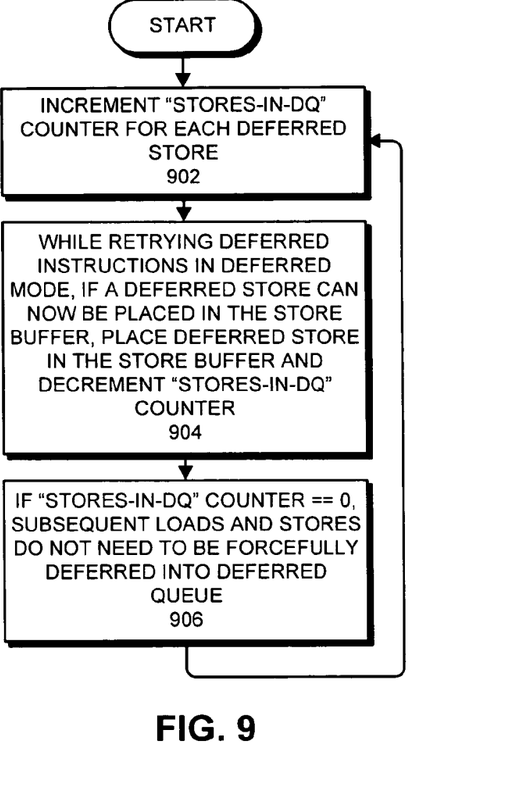
FIG. 9 presents a flow chart illustrating how a counter can be used to keep track of the number of stores in the deferred queue in accordance with an embodiment of the present invention.

FIG. 9 presents a flow chart illustrating how stores-in-DQ counter 404 can be used to keep track of the number of stores in deferred queue 112 in accordance with an embodiment of the present invention. For each store that is deferred during execute-ahead mode 504, the system increments stores-in-DQ counter 404 (step 902).

While retrying deferred stores in deferred mode 506, if a deferred store can be placed in store buffer 202 (for example, because there is space in store buffer 202, or because a preceding deferred store has completed), the system executes the store in deferred mode 506. This involves placing the store into store buffer 202 and decrementing stores-in-DQ counter 404 (step 904).

If stores-in-DQ counter 404 reaches zero, no stores remain in deferred queue 112. Consequently, subsequent loads and stores do not have to be forcefully deferred into deferred queue 112 (step 906).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for entering a scout mode when stores that are encountered during an execute-ahead mode exceed the capacity of a store buffer in a processor, comprising:

upon encountering an unresolved data dependency during execution of an instruction in a program during a normal execution mode, generating a checkpoint that can subsequently be used to return execution of the program to the point of the instruction, and executing the instruction and subsequent instructions in the execute-ahead mode, wherein instructions that cannot be executed because of an unresolved data dependency are deferred, wherein other non-deferred instructions are executed in program order, wherein the store buffer is gated so that stores that enter the store buffer during execute-ahead mode remain in the store buffer until the processor returns to normal execution mode, and wherein a store-in-DQ indicator is set in response to a store being deferred into a deferred queue;

upon encountering a store during the execute-ahead mode, wherein a store is encountered when the store leaves instruction grouping logic during execute-ahead mode, determining if the encountered store will exceed the capacity of the store buffer by incrementing a stores-during-execute-ahead counter and checking if the incremented value of the counter exceeds the store buffer capacity, wherein the stores-during execute-ahead counter keeps a count of only the stores encountered during execute-ahead mode, and wherein the encountered store exceeding the store buffer capacity indicates that the encountered store along with all stores in the deferred queue and store buffer together exceed the store buffer capacity, and if the encountered store will exceed the store buffer capacity, which means that the store buffer will never have additional space to accept additional stores during the execute-ahead mode because the store buffer is gated, prefetching a cache line which includes a target for the store, and entering the scout mode, wherein instructions are speculatively executed to prefetch cache lines for future loads and stores, but wherein results are not committed to the architectural state of the processor;

otherwise, if the encountered store will not exceed the store buffer capacity, placing the store in the deferred queue if the store-in-DQ indicator has been previously set in response to another store, and placing the store in the store buffer if the store-in-DQ indicator has not been previously set in response to another store; and upon encountering a non-data dependent stall, entering the scout mode.

2. The method of claim 1, wherein if the unresolved data dependency is resolved during execute-ahead mode, the method further comprises:

executing deferred instructions in a deferred mode; and if all deferred instructions are executed, returning to the normal execution mode to resume normal program execution from the point where the execute-ahead mode left off.

3. The method of claim 2, wherein executing deferred instructions in the deferred mode involves:

issuing deferred instructions for execution in program order;

deferring execution of deferred instructions that still cannot be executed because of unresolved data dependencies; and executing other deferred instructions that are able to be executed in program order.

4. The method of claim 3, wherein while executing deferred instructions in the deferred mode, if a deferred store is encountered, and the store buffer now has capacity because one or more stores that entered to store buffer prior to execute-ahead mode have left the store buffer, the method further comprises:

entering the deferred store into the store buffer instead of deferring the deferred store again;

wherein if no stores remain in a deferred queue, subsequent loads and stores are no longer forcefully deferred.

5. The method of claim 3, wherein if some deferred instructions are deferred again, the method further comprises returning to execute-ahead mode at the point where execute-ahead mode left off.

6. The method of claim 1, wherein when the unresolved data dependency or the non-data dependent stall condition that originally caused the processor to move out of normal execution mode is finally resolved, using the checkpoint to resume execution in normal execution mode from the instruction that originally encountered the stall condition.

7. The method of claim 1, wherein upon encountering a load during the execute-ahead mode, the method farther comprises:

determining if a load buffer is full; and if the load buffer is full, prefetching a cache line which includes a target for the load, deferring execution of the load, and marking a destination register for the load to indicate that a value in the destination register is subject to an unresolved data dependency.

8. The method of claim 1, wherein after a store is deferred into the deferred queue during execute-ahead mode, if a load is subsequently encountered, the method further comprises:
prefetching a cache line for the load; and
deferring execution of the load to prevent a possible read-after-write (RAW) hazard.

9. The method of claim 1, wherein executing instructions involves keeping track of data dependencies to facilitate determining if a given instruction is subject to an unresolved data dependency.

10. The method of claim 9, wherein keeping track of data dependencies involves maintaining state information for each register, which indicates whether or not a value in the register depends on an unresolved data-dependency.

11. The method of claim 1, wherein the unresolved data dependency can include:
a use of an operand that has not returned from a preceding load miss;
a use of an operand that has not returned from a preceding translation lookaside buffer (TLB) miss;
use of an operand that has not returned from a preceding full or partial read-after-write (RAW) from store buffer operation; and
a use of an operand that depends on another operand that is subject to an unresolved data dependency.

12. An apparatus that enters a scout mode when stores that are encountered during an execute-ahead mode exceed the capacity of a store buffer in a processor, comprising:
the processor;
an execution mechanism within the processor;
wherein upon encountering an unresolved data dependency during execution of an instruction in a program during a normal execution mode, the execution mechanism is configured to,
generate a checkpoint that can subsequently be used to return execution of the program to the point of the instruction, and to
execute the instruction and subsequent instructions in the execute-ahead mode, wherein instructions that cannot be executed because of an unresolved data dependency are deferred, wherein other non-deferred instructions are executed in program order, wherein the store buffer is gated so that stores that enter the store buffer during execute-ahead mode remain in the store buffer until the processor returns to normal execution mode, and wherein a store-in-DQ indicator is set in response to a store being deferred into a deferred queue;
wherein upon encountering a store during the execute-ahead mode, wherein a store is encountered when the store leaves instruction grouping logic during execute-ahead mode, the execution mechanism is configured to,
determine if the encountered store will exceed the capacity of the store buffer by incrementing a stores-during-execute-ahead counter and checking if the incremented value of the counter exceeds the store buffer capacity, wherein the stores-during execute-ahead counter keeps a count of only the stores encountered during execute-ahead mode, and wherein the encountered store exceeding the store buffer capacity indicates that the encountered store along with all stores in the deferred queue and the store buffer together exceed the store buffer capacity, and if the encountered store will exceed the store buffer capacity, which means that the store buffer will never have additional space to accept additional stores during the execute-ahead mode because the store buffer is gated, to
prefetch a cache line which includes a target for the store, and
enter the scout mode, wherein instructions are speculatively executed to prefetch cache lines for future loads and stores, but wherein results are not committed to the architectural state of the processor;
otherwise, if the encountered store will not exceed the store buffer capacity,
to place the store in the deferred queue if the store-in-DQ indicator has been previously set in response to another store,
and to place the store in the store buffer if the store-in-DQ indicator has not been previously set in response to another store; and
wherein upon encountering a non-data dependent stall, the execution mechanism is configured to enter the scout mode.

13. The apparatus of claim 12, wherein if the unresolved data dependency is resolved during execute-ahead mode, the execution mechanism is configured to:
execute deferred instructions in a deferred mode; and
if all deferred instructions are executed, to return to the normal execution mode to resume normal program execution from the point where the execute-ahead mode left off.

14. The apparatus of claim 13, wherein while executing deferred instructions in the deferred mode, the execution mechanism is configured to:
issue deferred instructions for execution in program order;
defer execution of deferred instructions that still cannot be executed because of unresolved data dependencies; and to
execute other deferred instructions that are able to be executed in program order.

15. The apparatus of claim 14, wherein while executing deferred instructions in the deferred mode, if a deferred store is encountered, and the store buffer now has capacity because one or more stores that entered to store buffer prior to execute-ahead mode have left the store buffer, the execution mechanism is configured to:
enter the deferred store into the store buffer instead of deferring the deferred store again;
wherein if no stores remain in a deferred queue, subsequent loads and stores are no longer forcefully deferred.

16. The apparatus of claim 14, wherein if some deferred instructions are deferred again, the execution mechanism is configured to return to execute-ahead mode at the point where execute-ahead mode left off.

17. The apparatus of claim 12, wherein when the unresolved data dependency or the non-data dependent stall condition that originally caused the processor to move out of normal execution mode is finally resolved, the execution mechanism is configured to use the checkpoint to resume execution in normal execution mode from the instruction that originally encountered the stall condition.

18. The apparatus of claim 12, wherein upon encountering a load during the execute-ahead mode, the execution mechanism is configured to:
determine if a load buffer is full; and
if the load buffer is full, to
prefetch a cache line which includes a target for the load, defer execution of the load, and to mark a destination register for the load to indicate that a value in the destination register is subject to an unresolved data dependency.

19. A computer system that enters a scout mode when stores that are encountered during an execute-ahead mode exceed the capacity of a store buffer in a processor, comprising:

the processor;

a memory;

an execution mechanism within the processor;

wherein upon encountering an unresolved data dependency during execution of an instruction in a program during a normal execution mode, the execution mechanism is configured to, generate a checkpoint that can subsequently be used to return execution of the program to the point of the instruction, and to execute the instruction and subsequent instructions in the execute-ahead mode, wherein instructions that cannot be executed because of an unresolved data dependency are deferred, wherein other non-deferred instructions are executed in program order, wherein the store buffer is gated so that stores that enter the store buffer during execute-ahead mode remain in the store buffer until the processor returns to normal execution mode, and wherein a store-in-DQ indicator is set in response to a store being deferred into a deferred queue;

wherein upon encountering a store during the execute-ahead mode, wherein a store is encountered when the store leaves instruction grouping logic during execute-ahead mode, the execution mechanism is configured to, determine if the encountered store will exceed the capacity of the store buffer by incrementing a stores-during-execute-ahead counter and checking if the incremented value of the counter exceeds the store buffer capacity, wherein the stores-during execute-ahead counter keeps a count of only the stores encountered during execute-ahead mode, and wherein the encountered store exceeding the store buffer capacity indicates that the encountered store along with all stores in the deferred queue and the store buffer together exceed the store buffer capacity, and if the encountered store will exceed the store buffer capacity, which means that the store buffer will never have additional space to accept additional stores during the execute-ahead mode because the store buffer is gated, to prefetch a cache line which includes a target for the store, and enter the scout mode, wherein instructions are speculatively executed to prefetch cache lines for future loads and stores, but wherein results are not committed to the architectural state of the processor;

otherwise, if the encountered store will not exceed the store buffer capacity, to place the store in the deferred queue if the store-in-DQ indicator has been previously set in response to another store, and to place the store in the store buffer if the store-in-DQ indicator has not been previously set in response to another store; and wherein upon encountering a non-data dependent stall, the execution mechanism is configured to enter the scout mode.

\* \* \* \* \*